Patented Apr. 1, 1941

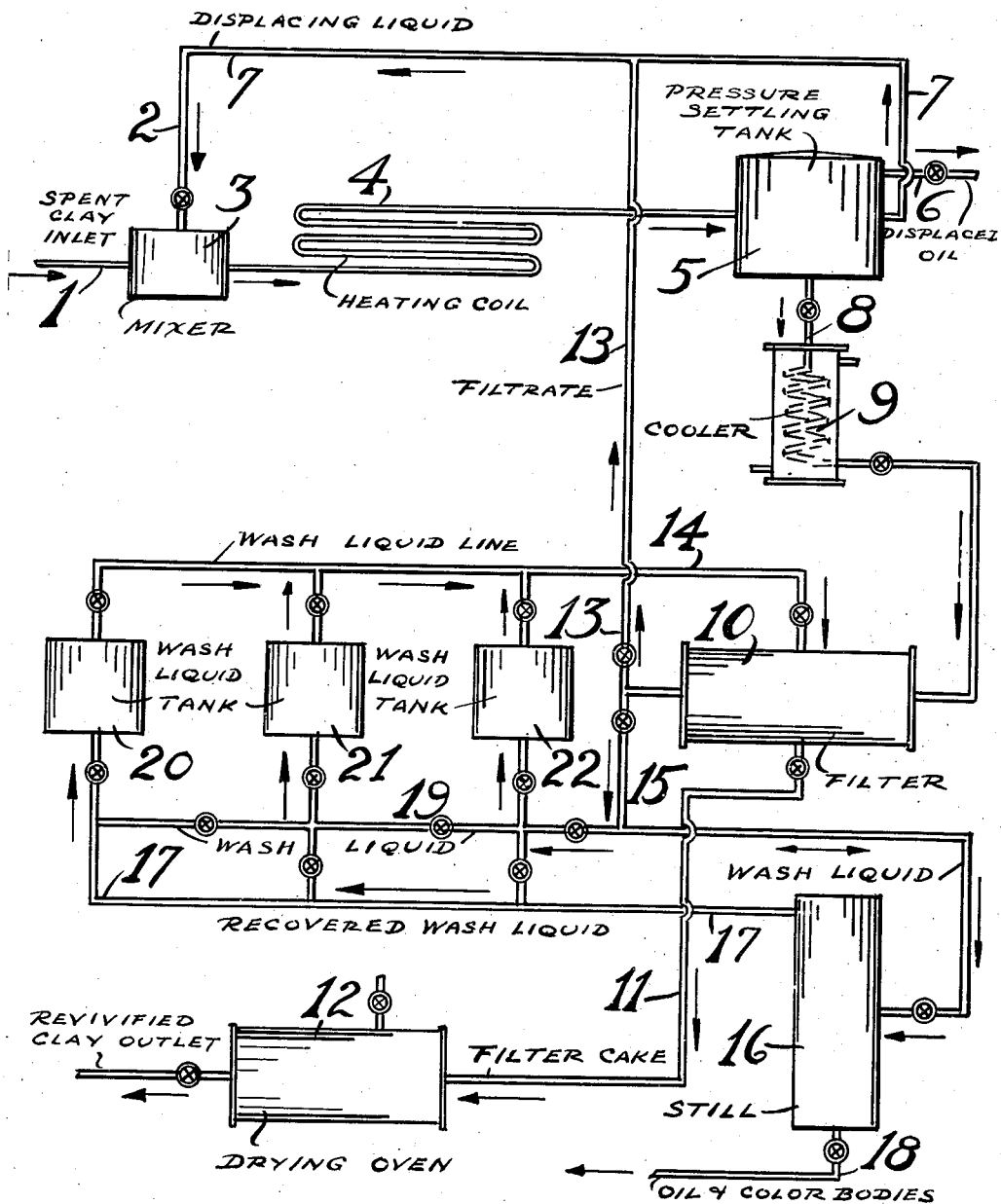

2,236,679

UNITED STATES PATENT OFFICE 2,236,679

REVIVIFICATION OF DECOLORIZING ADSORBENTS

Robert P. Ferguson, Cranford, and Frederick W. Schumacher, Mountainside, N. J., assignors to Standard Oil Development Company, a corporation of Delaware Application September 27, 1938, Serial No. 231,866

8 Claims. (Cl. 252—279)

The present invention is concerned with the revivification of various adsorbents used in the decolorization of oils. The reactivation of these materials in accordance with the process of the present invention is accomplished by treating the same with water, aqueous solutions, or other liquids immiscible with oil, at elevated temperatures and pressures.

It is well known in the art to decolorize mineral, vegetable, and animal oils with various adsorbents, as for example, fuller's earth, such as Attapulgus or Floridin clays, acid activated clays such as Super Filtrol and Tonsil, bauxites such as Porocel, synthetic materials such as Magnesol, and bone char. In these processes, the oil is contacted with the adsorbent either by the percolation filtration process or by the contact filtration process. The adsorbent and oil are contacted under various temperature and pressure conditions adapted to secure the maximum efficiency in the removal of color bodies. The adsorbent is then removed from the treated oil and is in many cases discarded since it is relatively expensive to reactivate or revivify. However, several processes of reactivating these materials have been employed. For example, it is known to wash spent clays with solvents such as naphtha, benzol, ketones, esters or combinations of these various solvents, to remove the adsorbed oil and color bodies and then to remove the naphtha or other solvent. It is also known to remove the color bodies by means of heating, in which the adsorbed color bodies are removed by vaporization and oxidation. These processes, however, have not been entirely satisfactory due to the fact that the solvents are relatively expensive and the efficiency of the reactivated clays decreases appreciably with repeated reactivations. Various adsorbents also deteriorate at reactivation temperatures thus causing a high adsorbent loss.

We have now discovered a process by which it is possible to secure substantially complete revivification of such adsorbents in an economical manner. It is also possible by our process to reactivate the adsorbent any number of times without incurring any substantial loss in the activity. Our invention reactivates adsorbents by displacing the adsorbed oil and color bodies with a liquid immiscible with oil rather than by a process of dissolving these materials.

The process of our invention securing these desirable results may be readily understood by reference to the attached drawing showing one modification of the same. For the purpose of the description, it is assumed the adsorbent is a spent clay which has been used for the removal of color bodies from petroleum oil.

Spent clay is introduced into mixer 3 by means of line 1. A sufficient quantity of displacing liquid, as for example water, is introduced into mixer 3 by means of line 2. The clay and liquid are thoroughly mixed in 3 and are then passed through suitable heating equipment 4, in which the temperature is raised to above 220° F. Sufficient pressure is maintained on the equipment so that the displacing medium remains in a liquid condition. The heated clay slurry is then introduced into pressure settling drum 5, in which drum the clay is allowed to settle from the displacing medium and the oil phase. The oil phase may be removed from the top of pressure drum 5 by means of line 6 which contains the displaced oil and color bodies. The displacing medium is withdrawn from pressure drum 5 from a point somewhat below the interface between the oil phase and the displacing medium by means of line 7. The displacing liquid may be recycled to mixer 3 by means of line 2. The wet clay is withdrawn from pressure settling drum 5 by means of line 8 through cooler 9 and separated from excess liquids in filter press 10. The clay may be used after this treatment and is withdrawn by means of line 11 through drying oven 12. In drying oven 12 the clay may be dried to any desirable moisture content. The separated displacing liquid is returned through line 13 and may be recycled through mixer 3. By the process described, complete displacement of the oil and color bodies from the spent clay is secured by heating with water at elevated temperatures and pressures. However, with various oils, some of the displaced material does not float to the surface but remains occluded in the clay mass. Under these conditions, it is desirable to wash the clay in filter 10 with various washing solutions. The washing liquids are secured from wash liquid storages 20, 21, and 22 and are introduced into 10 by means of line 14, and withdrawn by means of line 15. The washing liquid may be subsequently separated from the small amount of occluded color bodies by distilling in equipment 16, removing the overhead by means of line 17 and the oil and color bodies by means of line 18. If desirable, washing liquid may be recycled by means of line 19. The washed filter cake is withdrawn from 10 by means of line 11 and dryed in oven 12.

The process of the present invention may be widely varied. The displacing liquid may be pure water or aqueous solutions of other substances such as soaps, alkalies, acids, ketones, phenols, alcohols, and the like. Any displacing liquid having desirable physical properties and which is immiscible with the oil and color bodies at the temperatures and pressures employed is suitable. The preferred solutions are, however, aqueous solutions containing at least 50% water. Especially desirable solutions are solutions containing from 96 to 98% water and containing 2% acid.

The volume of displacing liquid employed per volume of clay being revivified will depend upon the particular displacing medium employed as well as upon the type and character of the clay. In general, it is preferred to use from 5 to 50 gallons of displacing liquid per 100 lbs. of clay being revivified.

The temperature at which the clay is contacted with the displacing solution likewise will vary over a wide range. In general, the clay is contacted with the displacing liquid at a temperature in the range from about 220 to 710° F. Especially desirable results are secured when the clay is contacted with the displacing solution at a temperature in the range from about 350 to 550° F. The pressure employed in all cases should be sufficient to keep the displacing medium in a liquid condition, and thus will depend upon the vapor pressure of the displacing liquid employed and upon the temperature of contact.

After the oil has been displaced from the clay by means of a suitable displacing medium, the respective layers are withdrawn as previously described. The clay slurry is preferably cooled and then filtered. The clay is then withdrawn from the filter and suitably dried to a desirable moisture content. In general, it is preferred to dry the clay to about 20–30% volatile content, the volatile content being determined by heating the clay at 1650° F. for ½ hour at atmospheric pressure.

Although clay may be suitably revivified in the above-described manner, especially desirable results are secured by washing the clay cake on the filter with various washing liquids. These washing liquids tend to cleanse the clay of minute entrained displaced color bodies and oil.

Various materials may be employed as washing solutions, as for example, a substance selected from the class of alcohols, esters, ketones, light petroleum fractions boiling below about 550° F., ethers, and the like. Desirable washing substances are, for example, alcohols and naphthas. It has been found that excellent results are secured, for example, by first washing the clay on the filter with isopropyl alcohol followed by washing with light naphtha. The quantity of washing solution employed will depend upon the particular washing solution used, as well as upon the type of clay being revivified, and also upon the displacing solution employed.

In general, it is preferred to use from 10 to 100 gallons of washing solution per 100 lbs. of clay. For example, when washing with alcohol followed by washing with naphtha, it is desirable to use from 5 to 20 gallons of alcohol per 100 lbs. of clay and from 10 to 30 gallons of naphtha per 100 lbs. of clay.

A particularly important modification of the present invention is that in certain operations it may be desirable to acidify the clay in revivification. Thus, in this type of operation, for example, the color bodies and oil could be displaced by water or an aqueous solution in 5 and the stratified layer removed as described. The clay would be filtered in 10 followed by washing with alcohol withdrawn from 21 and then washed with naphtha from 22. The filter cake could then be readily acidified with an acid wash from 20.

This process could also be modified and the operation conducted, for example, by displacing color bodies and oil in 5 by means of water or aqueous solution, the stratified layer separated and removed as described above and the clay filtered in 10. The clay could then be washed with an acidified solution as, for example, with acidified alcohol followed by washing with light naphtha. Another modification may be, for example, to displace the color bodies and oil from the clay in 5 by means of an acidified aqueous solution. In this operation the clay would be separated from the stratified layer as described and taken directly to drying oven 12, thus bypassing the filtering or the washing operations or both. Particularly desirable results are secured in this operation by means of a solution comprising from about 50–60% water, 40–50% alcohol, and 2–4% acid.

In order to further illustrate the invention the following examples are given. These examples are given merely for illustrative purposes and should not be construed as limiting the invention in any manner whatsoever.

EXAMPLE 1

Spent Super Filtrol decolorizing clay was revivified by treating with water at a temperature of about 500° F. and at a pressure of about 700 lbs. per square inch. The water-clay slurry was maintained under these conditions in a pressure vessel for approximately 5 minutes. At the end of this period the settled clay was withdrawn. Upon testing this clay, it was found to be approximately 75% as efficient as the original Super Filtrol clay. Results of this operation are summarized below.

Table 1

| Clay | Fresh Super Filtrol | | | | Recovered Super Filtrol |
|---|---|---|---|---|---|
| Pounds clay/gal | 0 | 0.25 | 0.375 | 0.5 | 0.5 |
| Temperature of contact (°F.) | | 425 | 425 | 425 | 425 |
| Color finished oil (T. R.) | ½ | 7¼ | 9¼ | 12½ | 9¼ |

From the above data, it may readily be seen that the revivified clay, when used in the proportion of 0.5 lb. of clay per gallon of oil, at 425° F., gave approximately 75% of the improvement secured with fresh clay.

EXAMPLE 2

Solvent extracted distillate stock having an A. P. I. gravity of 29.4, flash of 450° F., and a viscosity of 100° F. of 325 Universal Saybolt seconds was contacted with 0.5 lb. per gallon of Super Filtrol clay at 425° F. The spent clay from this operation was then revivified by various modifications of the process of the present invention. In some operations the displacing liquid was water; in other operations water was used as a displacing liquid and various washing solutions were employed. In further operations the displacing liquids were aqueous solutions containing small percentages of other substances, as for example, sulfuric acid, acetone, alcohol, and the like. Various washing solutions were employed in these latter operations. The results of these operations are summarized below.

Table 2

| Operation No. | Displacing liquid | Displacing temp. °F. | Gage pressure, lbs./sq. in. | First wash liquid | Second wash liquid | Third wash liquid | Efficiency, percent (compared to fresh Super Filtrol of equivalent volatile matter content) |
|---|---|---|---|---|---|---|---|
| 1 | Water | 510 | 750 | | | | 52 |
| 2 | do | 510 | 750 | Naphtha | | | 61 |
| 3 | do | 510 | 750 | do | 2% aqueous sulfuric acid | | 99 |
| 4 | do | 510 | 750 | Benzol | do | | 108 |
| 5 | do | 510 | 750 | 2% aqueous acid | Isopropyl alcohol | Naphtha | 113 |
| 6 | 98% water, 2% sulfuric acid | 510 | 750 | Naphtha | | | 93 |
| 7 | 98% water, 2% phenol | 510 | 750 | | | | 63 |
| 8 | 98% water, 2% sodium hydroxide | 510 | 750 | 2% aqueous acid | | | 73 |
| 9 | 80% water, 20% acetone | | 750 | | | | 69 |
| 10 | 50% water, 50% isopropyl alcohol | 420 | 750 | | | | 89 |
| 11 | 50% water, 50% isopropyl alcohol | 420 | 750 | Naphtha | 2% aqueous acid | | 114 |
| 12 | 50% water, 48% isopropyl alcohol, 2% sulfuric acid | 420 | 750 | | | | 124 |
| 13 | Water | 510 | 750 | Isopropyl alcohol | Naphtha | 2% aqueous acetic acid | 102 |

The above data clearly demonstrates that appreciable revivification of spent clay is secured by displacing adsorbed oil and color bodies with water at elevated temperatures and pressures. It may also be seen that somewhat better revivification is secured if the clay is subsequently washed with a washing solution, as for example, naphtha. Operations 3 and 4 demonstrate the desirability of including an acidified liquid wash. Operation 5 shows that especially desirable results are secured by a particular sequence of washing steps after displacement of the color bodies with water. Operation 6 demonstrates that the acidification and displacement steps may be combined into one stage. Operations 7 to 12 inclusive demonstrate the desirable results secured by modifying the composition of the displacing solution in combination with various sequences of washing steps. Operation 13 demonstrates that an organic acid may be used with approximately the same success as an inorganic acid.

EXAMPLE 3

Various oils were treated with Super Filtrol and revivified after each treatment. The clay was revivified by heating with 98% water and 2% acid at a temperature of 510° F. and a pressure of 750 lbs./sq. in. Following the treatment, the clay was given isopropyl alcohol and naphtha washes equivalent to 10 gals. and 15 gals. respectively, per 100 pounds of spent clay. The efficiency of the clay after each revivification may be seen by the following data:

Table 3

| Contact No. | Clay employed | Oil stock contacted | Efficiency, percent (fresh Super Filtrol of equivalent volatile matter=100%) |
|---|---|---|---|
| 1 | Fresh Super Filtrol | Acid treated Mid-Continent residuum | 100 |
| 2 | Reactivated clay from Contact No. 1 | Solvent extracted Mid-Continent distillate | 109 |
| 3 | Reactivated clay from Contact No. 2 | Pennsylvania neutral distillate | 103 |
| 4 | Reactivated clay from Contact No. 3 | do | 100 |
| 5 | Reactivated clay from Contact No. 4 | Solvent extracted Mid-Continent distillate | 97 |
| 6 | Reactivated clay from Contact No. 5 | do | 89 |

EXAMPLE 4

Spent Super Filtrol clay previously used for contacting solvent extracted Mid-Continent distillate was revivified by using various displacing liquids, followed by washing with suitable solvents to remove the occluded color bodies and oil. The efficiency of the revivified clay determined by again contacting the solvent extracted distillate with 0.5 lb./gallon of the partially dried clay secured from these various revivification processes may readily be seen by the following data:

Table 4

| | Displacing liquid | Temp., °F. | Gage pressure, lbs./sq. in. | First wash liquid | Second wash liquid | Third wash liquid | Efficiency, percent (fresh Super Filtrol of equivalent volatile matter=100%) |
|---|---|---|---|---|---|---|---|
| 1 | Water | 510 | 750 | Alcohol | Naphtha | 2% aqueous sulfuric acid | 71 |
| 2 | do | 510 | 750 | Alcohol wash from 1 | do | Acid wash from 1 | 79 |
| 3 | 50% water, 50% alcohol | 420 | 750 | | | | 67 |
| 4 | Displacing liquid from 3 | 420 | 750 | | | | 68 |

The above data demonstrate that alcohol and said wash may be reused without further purification. Operations 3 and 4 demonstrate that the displacing liquids may be reused without additional purification.

EXAMPLE 5

Samples of spent Super Filtrol clay were heated with liquid water to various temperatures and in each operation the clay was washed after the displacement stage. The clay was first washed with approximately 12 gallons of alcohol per 100 lbs. of spent clay followed by washing with 18 gallons of naphtha per 100 lbs. of spent clay, and then reacidified with approximately 6 gallons of 2% aqueous sulfur per 100 lbs. of spent clay. The efficiency of the revivified clay secured by the results of these various operations is summarized as follows:

Table 5

| No. | Displacing temp., °F. | Gage pressure, lbs./sq. in. | Efficiency, percent following washing procedure (fresh Super Filtrol of equivalent volatile matter = 100%) |
|---|---|---|---|
| 1 | 300 | 70 | 65 |
| 2 | 350 | 140 | 74 |
| 3 | 400 | 250 | 85 |
| 4 | 450 | 425 | 88 |
| 5 | 500 | 700 | 100 |

The process of the present invention is very desirable in that the clay is revivified by displacing the color bodies and oil occluded in the clay. This is a distinct advantage over the use of solvents to remove these deleterious materials. In accordance with the present process, the clay is not subjected to temperature conditions which are detrimental to its decolorizing efficiency. Furthermore, by operating in accordance with our invention, it is possible to replace to any desired amount the effective moisture content of the clay. In addition, there is practically 100% recovery of the oil which is commonly lost through clay soakage thus further enhancing the economics of the present process.

The present process may be readily applied to the revivification of decolorizing and deodorizing adsorbents, utilized in the refinement of animal, vegetable, and mineral oils, as for example, in the treatment of any petroleum fractions such as naphthas, lubricating oils, petroleum waxes, petroleum resins, and the like. Although the present process is particularly directed to the revivification of decolorizing clays used in the treatment of petroleum products, it is readily used for the revivification of other adsorbents, such as synthetic decolorizing and deodorizing substances, bone char, and the like.

The above invention is not to be limited by any theory or mode of operation but only in and by the following claims in which it is intended to claim all novelty in so far as the prior art permits.

We claim:

1. A process of revivifying spent decolorizing clays comprising treating said clays with an aqueous solution at a temperature in the range from 220 to 700° F. under sufficient pressure of at least 140 pounds per square inch to maintain the solution in a liquid condition, holding the clay under these conditions to effect substantial displacement of oil and color bodies, separating the clay from the aqueous reactivating solution, washing the clay with a solvent adapted to remove the aqueous solution and occluded impurities, washing the clay with an aqueous solution containing approximately 2 to 4% of sulfuric acid, removing the washed clay and drying the same.

2. Improved process of reactivating spent decolorizing clay comprising treating said clay with an aqueous solution at a temperature in the range from 350 to 550° F. and at a pressure of at least 140 pounds per square inch adapted to maintain the solution in the liquid condition, holding the clay under these conditions to effect substantially complete displacement of the oil and color bodies, separating the displacing solution and the impurities, subjecting said separated clay to a washing operation with a solvent adapted to remove occluded portions of the oil and color bodies, separating the solvent, subjecting the separated clay to a washing operation with an aqueous solution containing from 2 to 4% of sulfuric acid, removing the clay and drying the same.

3. Process in accordance with claim 2 in which said aqueous washing solution comprises a mixture of alcohol, water and acid.

4. Process of revivifying spent decolorizing clay comprising treating said clay with liquid water at a temperature in the range from about 220 to 700° F. and at a pressure of at least 140 pounds per square inch, maintaining the clay and water under these conditions until substantial displacement of the oil and color bodies from the clay is secured, separating the stratified displacing liquid and the layer of color bodies and oil from the clay, removing the clay and filtering the same, then subjecting said clay to an alcohol wash, a naphtha wash, and an acidic wash successively, removing the clay and drying the same to an optimum moisture content.

5. Process in accordance with claim 4 in which said temperature is in the range from about 350 to 550° F.

6. Process of revivifying spent decolorizing clay comprising subjecting said clay to a treatment with liquid water at a temperature in the range from about 350 to 550° F. and at a pressure of at least 140 pounds per square inch for a time sufficient to secure substantially complete displacement of color bodies and oil, separating the stratified layers from the clay, filtering the clay and then washing the same with a washing solution comprising acid and alcohol followed by washing the same with naphtha, removing the clay and drying to an optimum moisture content.

7. Process in accordance with claim 6 in which said washing solution comprising acid and alcohol contains approximately 2% acid.

8. Improved process of revivifying spent decolorizing clay comprising subjecting the clay to treatment with a liquid aqueous solution at a temperature in the range from about 350 to 550° F. and at a pressure in the range of 140 to 750 pounds per square inch for a time sufficient to secure substantially complete displacement of the color bodies and oil, separating the clay from the stratified layers, subjecting the separated clay to a treatment with an aqueous solution containing approximately 2 to 4% of an acid and drying the same to an optimum moisture content.

ROBERT P. FERGUSON.
FREDERICK W. SCHUMACHER.